United States Patent [19]
MacQuilkin et al.

[11] 3,756,417
[45] Sept. 4, 1973

[54] FILTER LEAF CONSTRUCTION AND METHOD OF MAKING SAME

[75] Inventors: Arthur E. MacQuilkin, Downers Grove; Hans Jensen, Hinsdale, both of Ill.

[73] Assignee: Industrial Filter & Pump Mfg. Co., Cicero, Ill.

[22] Filed: Dec. 4, 1970

[21] Appl. No.: 95,199

[52] U.S. Cl. .............................. 210/486, 264/347
[51] Int. Cl. ........................................... B01d 25/02
[58] Field of Search ........................... 210/486, 487; 264/347

[56] References Cited
UNITED STATES PATENTS
2,061,351  11/1936  Denhard ............................ 210/486
1,323,421  12/1919  Sweetland ......................... 210/486

Primary Examiner—John Adee
Attorney—Fidler, Patnaude & Batz

[57] ABSTRACT

A filter leaf for use in a pressure filter tank includes a pair of cake-supporting perforate sheets respectively overlying the opposite faces of a perforate core, a circumferential channel-shaped rim surrounding the sheets and the core, and a pair of flexible gaskets respectively disposed between the rim and the sheets to seal them to the rim. In one embodiment, a single gasket overlies the periphery of each perforate sheet and includes a rounded end portion extending radially inwardly beyond the rim on the exterior of the perforate sheet, whereby the pressure in the tank exerted on the rounded end portion causes it to deform and thus provide an even tighter seal between the sheet and the rim.

9 Claims, 7 Drawing Figures

PATENTED SEP 4 1973
3,756,417
SHEET 1 OF 2
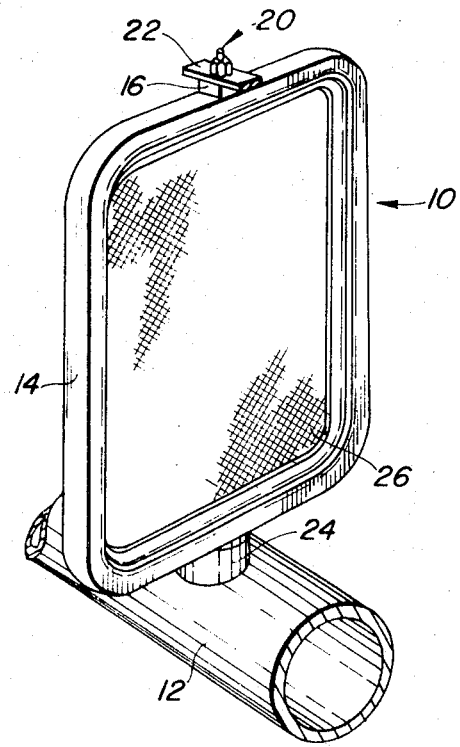
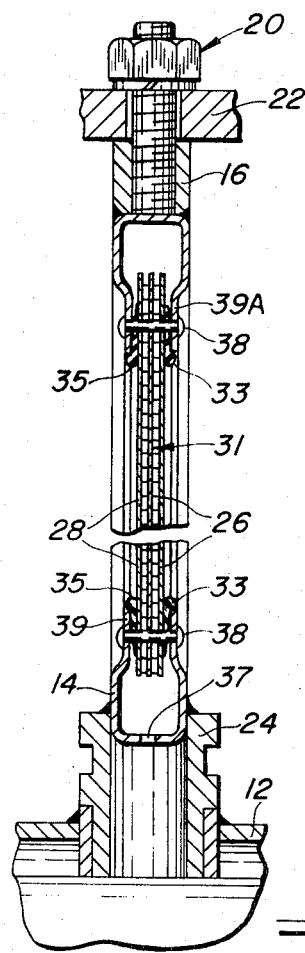
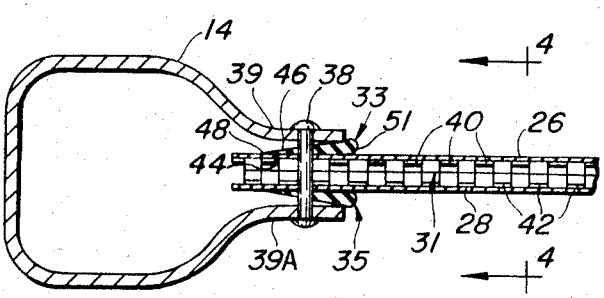
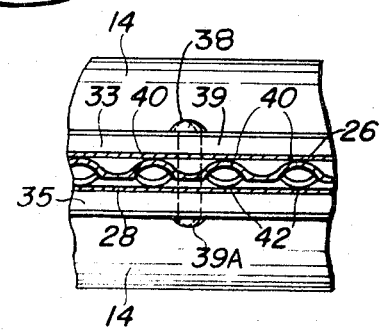
INVENTORS.
ARTHUR E. MacQUILKIN
HANS JENSEN
BY Fiddler, Bradley,
Pathaude & Doyle
ATTYS

FILTER LEAF CONSTRUCTION AND METHOD OF MAKING SAME

This invention relates to a filter leaf construction and method of making same, and it more particularly relates to a filter leaf which is adapted to be used in a pressurized filter tank.

Filter leaves of the type with which the present invention may be employed are generally mounted in a pressurizable filter tank and connected in fluid communication to a common outlet manifold so that the liquid to be filtered which is pumped into the tank flows through the leaves into the outlet manifold. In some applications, porous pre-coat cakes of particles are built up on the faces of the leaves and the liquid to be filtered is passed therethrough. Since the particles to be removed from the liquid are too large to penetrate the porous pre-coat layers they are deposited on the porous pre-coat layers.

In one common type of filter leaf construction, the leaf comprises a core, a pair of screens or sheets of fine mesh fabric material disposed on opposite faces of the core to provide surfaces upon which the pre-coat layers are built, and a continuous channel-shaped rim or frame surrounding the core and maintaining the leaf in assembled relationship. The core and the sheets are ordinarily secured to the frame by a plurality of spaced apart rivets. Such a filter leaf construction has not been entirely satisfactory for some applications since the sheets and the core are not adequately sealed to the frame. In this regard, unwanted gaps are present between the sheets and the frame, and with the prior art construction a tolerance of no better than 0.003 inch was common. With such a tolerance, in certain applications where higher pressure differentials are required for the filter, leakage occurs between the screens and the frame. Thus, it would be highly desirable to have a relatively simple filter leaf construction in which the core and the screens are more tightly sealed to the frame in such a manner that leakage is prevented.

Therefore, it is the principal object of the present invention to provide a new and improved filter leaf construction which is more easily constructed than those of the prior art.

Another object of the present invention is to provide a new and improved filter leaf construction which incorporates a better seal between the screens and the frame.

Briefly, the above and further objects may be realized in accordance with the present invention by providing continuous resilient gasket secured to the screen of a pressure filter leaf between the screen and the peripheral channel frame. In one embodiment of the invention the gasket is cemented and skived onto the screen, and in another embodiment, the gasket fits over the periphery of the screen. In both embodiments, however, the gasket includes an enlargement along the inner edge which is located just inside the channel frame to facilitate assembly of the leaf and to provide a better seal during use when the leaf is subjected to hydraulic pressures.

The invention, both as to its organization and method of operation, together with further objects and advantages thereof will best be understood by reference to the following detailed description taken in connection with the accompanying sheet of drawings, wherein:

FIG. 1 is an isometric view of a filter leaf which embodies the principles of the present invention.

FIG. 2 is a fragmentary, enlarged cross-sectional view of the filter leaf of FIG. 1;

FIG. 3 is an enlarged detailed view of a portion of the filter leaf of FIG. 2;

FIG. 4 is an enlarged, cross-sectional view of a portion of the filter leaf of FIG. 3 taken substantially along the line 4—4 thereof;

Figure 7:
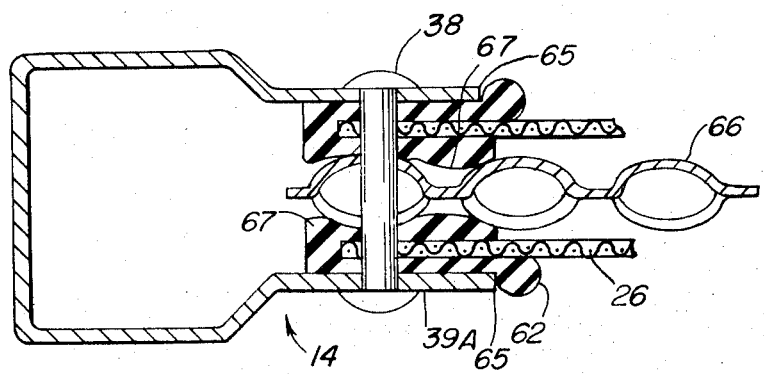
FIG. 7 is a sectional view of the filter leaf utilizing the gasket of FIG. 5.

Referring now to the drawings and more particularly to FIG. 1 thereof, there is shown a filter leaf 10 which is mounted on an outlet manifold 12 in a hermetically sealed pressurizable pressure tank (not shown in the drawings), and which incorporates the principles of the present invention. The filter leaf 10 includes a channel-shaped frame or rim 14 having at its top edge a support bracket 16 which is fixed to the frame 14 and fastened by means of a nut and bolt at 20 to a bar 22 extending transversely to the filter leaves in the tank, and having a bushing assembly 24 at its bottom edge for connecting the filter leaf in fluid communication with the outlet manifold 12, and a pair of fine mesh sheets 26 and 28 (FIGS. 2 and 3) which are composed of fine mesh screening or fine mesh fabric material for supporting respective porous precoat layers (not shown), and which overlie the opposite faces of a core 31 (FIGS. 2 and 3) surrounded by the frame 14. The core 31 is provided with irregular surfaces on the opposite faces thereof to convey the liquid passing through the screens to the frame 14 and thus to the manifold 12 via the bushing assembly 24. As shown in FIGS. 2 and 3 of the drawings, a pair of gaskets 33 and 35 are disposed between the frame 14 and the screens 26 and 28 to seal them to the frame 14 as hereinafter described in greater detail. As illustrated in FIG. 1, the frame is generally rectangular in shape, but it is to be understood that the present invention could be utilized in various different frames having various different shapes, such as a circular shape. In use, the fluid to be filtered is pumped into the filter tank and is forced through the faces of the filter leaf 10. As a result, certain materials, such as impurities which are too large to pass through the porous pre-coat layer or the screens 26 and 28, are deposited on the faces of the screens 26 and 28, and the remaining fluid passes through the faces of the screens and is guided by interconnected troughs or channels in the irregular surfaces of the core 31 to the manifold 12 via the bushing assembly 24.

Considering now the filter leaf in greater detail with reference to FIGS. 2 and 3 of the drawings, the filter leaf 10 is supported on the manifold 12 by means of the bushing assembly 24, whereby the manifold 12 supports both the filter leaves and the bar 22. The bushing assembly 24 is hollow and its lower end fits in an opening in the manifold 12 and is sealed thereto. A hole 37 in the bottom edge of the frame 14 permits the filtrate to flow from the frame 14 into the manifold 12 via the bushing assembly 24. A series of rivets 38 extend through aligned holes in a pair of oppositely facing flanges 39 and 39A of the frame 14, screens 26 and 28, the core 31, and the resilient gaskets 33 and 35, thereby securing the screens 26 and 28, the core 31, and the gaskets 33 and 35 to the frame 14. The core 31 is provided with drainage troughs for conveying the fluid flowing through the screens 26 and 28 to the frame 14 by rows of spaced apart arches 40 and 42, the rows of arches 40 extending from one side of the core 31 alternating with the rows of arches 42 extending from the opposite face of the core 31. The arches 40 and 42 define drainage passageways which empty into the frame 14. It will be understood that the present invention finds application with other types of cores such as the woven wire type and the fluted, solid type.

Referring now to FIGS. 3 and 4 and considering now the gaskets 33 and 35 in greater detail, the gaskets are identical to one another, and each one is composed of a flexible material, such as rubber. They extend around the screens a fixed distance from the periphery of the screens 26 and 28 and are wedge-shaped in cross section. In this regard, as shown in FIG. 3, each one of the gaskets, such as the gasket 33, has a surface 44 conforming to the outer face of the screen 26, and its opposite face 46 is tapered to an edge 48 located within the frame 14. The opposite edge 51, which is disposed inside of the frame 14 provides an enlargement which engages the inner edge of the flange 39. This enlargement is rounded so that when the filter 10 is in use, the pressure differential which exists between the liquid surrounding the filter 10 inside of the filter tank and the space within the frame 14 acts upon the rounded end portion 51 to deform it against the adjacent edge of the flange 39 and the screen 26 thereby to provide an extremely tight seal betweeen the screen 26 and the flange 39 of the frame 14. Thus, where high pressure filter tanks are employed, the greater the pressure differential, the tighter the seal produced by the gaskets 33 and 35. By utilizing the gaskets 33 and 35 of the present invention, a relatively smaller number of rivets 38 can be employed as compared to prior art filter leaves, thereby reducing the cost of manufacturing the filter leaves. Moreover, the tolerance can be held to 0.001 inch or less between the screens 26 and 28 and the respective flanges 39 and 39A of the frame 14.

Considering now the method of manufacturing the filter leaf 10 of the present invention, the gaskets 33 and 35 are first secured to the periphery of the sheets 26 and 28 by placing gaskets (not shown) which are substantially oval shape in cross section and which are composed of uncured rubber, near the edges of the screens 26 and 28, and then skiving the gasket material onto the screens 26 and 28 by any suitable tool. In this regard, the uncured rubber gaskets are repeatedly pressed against the sheets 26 and 28 to force the gaskets into mechanically locking engagement with the sheets to secure them in place, In so doing, the gaskets 33 and 35 are shaped to provide them with their wedge shape as explained in the foregoing description. A convenient tool (not shown) for skiving the gaskets onto the sheets 26 and 28 is a hand tool which has a wheel with a serrated edge so that the wheel can be rolled over the gasket to form the sloping surface 46 of the gasket 33.

After skiving the gaksets 33 and 35 to shape and secure them to the respective screens 26 and 28, the screens are then placed in overlying engagement with the opposite faces of the core 31 and the sandwich is then slipped into the frame 14 between the flanges 39 and 39A thereof while the flanges are spread apart. In so doing, the uncured rubber gaskets 33 and 35 are wedged into place between the sheets 26 and 28 and the adjacent flanges 39 and 39A of the frame 14 to fill any irregularities therebetween. Moreover, the gaskets 33 and 35 provide continuous locating beads which facilitate centering of the screens and the core in the frame 14. This feature in itself results in a very substantial saving in the time required to assemble filter leaves and also eliminates defective leaves resulting from improper location of one or both screens in the frame. Spaced apart holes are then drilled through the core 31, the sheets 26 and 28, the gaskets 33 and 35, and the flanges 39 and 39A of the frame 14 to receive the rivets 38. Alternatively, a series of holes can be pre-drilled in the frame 14 before assembling and the other holes drilled after assembly. After the rivets are secured in position, the entire filter leaf 10 may be heat-treated to cure the rubber gaskets 33 and 35.

Figure 5:
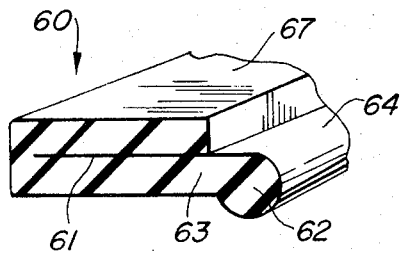
FIG. 5 is a fragmentary schematic view partly in section of a gasket embodying certain features of the invention.
Figure 6:
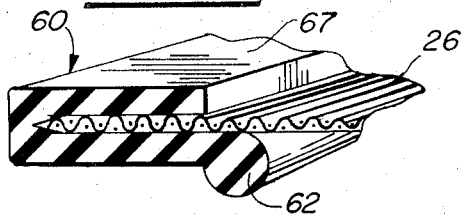
FIG. 6 is a view similar to that of FIG. 5 showing the gasket of FIG. 5 assembled to a screen.

Referring now to FIGS. 5, 6, and 7, there is shown another embodiment of the invention wherein the gaskets which seal the screens to the frame are extruded and cured prior to assembly of the filter leaves with which they are used. The pre-formed gaskets each include a continuous enlargement adapted to lie adjacent to the inner edge of the adjacent flange on the frame member to provide locating beads for centering the screens in the frame during assembly and to provide a better seal during operation of the filter.

As shown in FIG. 5, a gasket for sealing strip 60 is a rubber extrusion provided with a knife slit 61 and an enlargement or bead 62. The bead 62 forms on the outer edge of a flange 63 which has an upper surface 64 lying coplanar with the slit 61. The strip 60 is spread apart along the slit 61 and placed on the periphery of an accurately cut screen 26 as shown in FIG. 6. The bead 62 is thus spaced a fixed distance from the edge of the screen and when placed in a frame 14 as shown in FIG. 7 lies adjacent the inner edge 65 of the flange 39A on the frame 14 to facilitate centering thereof during assembly. When the assembly is completed by riveting the screens and core 66 to the frame the surface 64 of the gasket 67 is deformed to provide a tight fit against the core.

In view of the foregoing description, it will now be apparent that there is provided in accordance with the present invention a filter leaf having a pair of cake-supporting perforate sheets respectively overlying the opposite faces of a drainage core, a circumferential frame surrounding the sheets and the core, and a pair of resilient gaskets respectively disposed between the frame and the screens to seal the screens to the frame. Each one of the gaskets has an enlarged edge portion which lies radially inwardly of the inner edge of the frame on the outside of the screens, whereby the pressure differential between the outside of the filter leaf and the inside of the frame acts upon the rounded end portions of the gaskets to deform them and to force them toward the adjacent edges of the frame to provide an improved seal between the screens and the frame.

While the present invention has been described in connection with particular embodiments thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

We claim:

1. A filter leaf for filtering entrained solids from a liquid passed therethrough, comprising
   a generally planar core having drainage passageways therein,
   a circumferential frame surrounding the periphery of said core, said frame being channel-shaped in cross section and having a pair of inwardly extending, substantially parallel flanges,
   an outlet conduit connected to said frame and communicating with said core,
   a pair of cake-supporting perforate screens respectively overlying the opposite faces of said core,
   a pair of resilient gaskets respectively disposed between said cake-supporting screens and said flanges to seal said screens to said frame, each of said gaskets being cemented and skived to said screens and having an enlarged edge portion extending radially inwardly beyond said flanges and abutting the distal edges thereof, and
   securing means for fastening said core and said screens to said frame.

2. A filter leaf according to claim 1, wherein said gaskets are composed of rubber.

3. A filter leaf according to claim 2, wherein said gaskets are wedge-shaped in cross section.

4. A filter leaf according to claim 1, wherein said enlarged edge portion of each of said gaskets is disposed a fixed distance from the periphery of the associated screens.

5. A filter leaf according to claim 4, wherein each of said gaskets is an elongated elastomeric strip fitted over the peripheral edge of the associated screen.

6. A filter leaf according to claim 5, wherein said strip is slit to receive said screen and said enlargement is a bead disposed on one side of said slit.

7. A method of making a filter leaf, comprising the steps of
   securing a pair of gaskets formed of uncured rubber to a pair of screens near the peripheral edges thereof,
   placing said screens on opposite sides of a drainage core,
   inserting said screens and said core in a peripheral frame with said gaskets interposed between said screens and said frame,
   securing said core and said screens to said frame by means maintaining said gaskets under compression between said screens and said frame, and then
   curing said gaskets.

8. A method according to claim 7 wherein said gaskets are secured to said screens by skiving.

9. A method according to claim 7 including the step of providing an enlargement on each of said gaskets and placing said enlargements a fixed distance from the edges of said screens to provide locating means for centering said screens in said frame.

* * * * *